April 27, 1926.
E. B. NOWOSIELSKI
IMPULSE COUPLING
Filed April 18, 1923
1,582,422
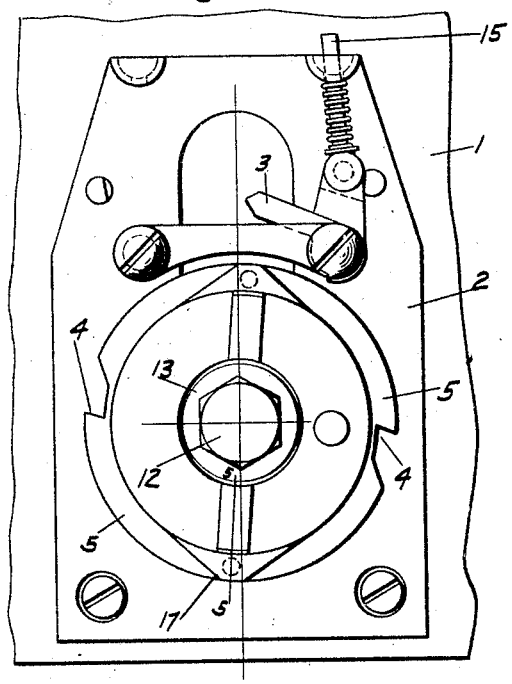
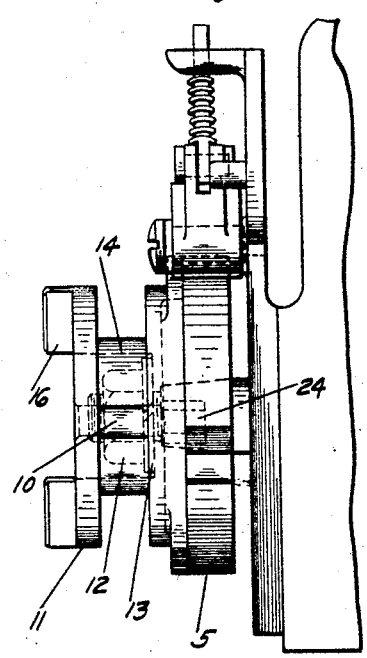
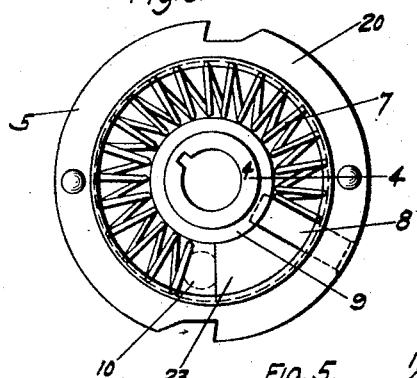
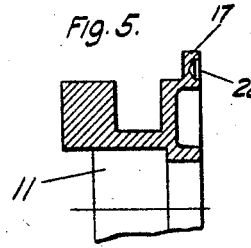
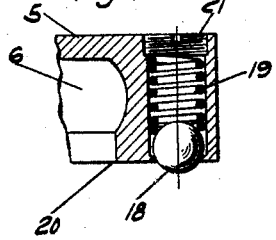
INVENTOR
EDWARD B. NOWOSIELSKI
BY
A. D. T. Libby
ATTORNEY Patented Apr. 27, 1926.

1,582,422

UNITED STATES PATENT OFFICE.

EDWARD B. NOWOSIELSKI, OF BLOOMFIELD, NEW JERSEY, ASSIGNOR TO SPLITDORF ELECTRICAL COMPANY, OF NEWARK, NEW JERSEY.

IMPULSE COUPLING.

Application filed April 18, 1923. Serial No. 632,964.

*To all whom it may concern:*

Be it known that I, EDWARD B. NOWOSIELSKI, a citizen of the United States, residing at Bloomfield, in the county of Essex, State of New Jersey, have invented certain new and useful Improvements in Impulse Couplings, of which the following is a description, reference being had to the accompanying drawing and to the figures of reference marked thereon.

This invention relates to automatic impulse starter couplings used in connection with magneto ignition generators. Impulse couplings are well known in the art, so no extended description appears to be necessary. Briefly, however, impulse couplings consist of a driven member attached to the magneto shaft, a driving member arranged to cooperate with the driven member, with an impulse spring adapted to function between the two coupling members. Means for holding the driven member through a predetermined number of degrees of rotation of the driven member are provided and further means are used for releasing the driven member whereby the impulse spring may cause the driven member to rapidly overtake the driving member. Where the drag or load of the nagneto armature or rotor is considerable, there may be a lag between the driving and driven members, particularly at high speeds, unless the impulse spring is exceedingly stiff, which is detrimental in that it causes the restraining device to perform more work and the blow hit by the driven member at the time of catching up with the driving member following the release, may be so severe as to cause a buffer, sometimes used to absorb the blow, to become damaged.

It is the principal object of my invention to provide means for preventing the lag between the driving and driven members, which means are relatively simple and inexpensive, although the broad idea of locking the driving and driven members together for normal operation is set forth in Martin Patent 1,318,218 issued October 7, 1919. In order to illustrate the application of my invention, I have shown its application to a coupling of the type shown in Hermann Patent 1,318,206 issued October 7th, 1919.

In the drawing accompanying this specification:

Figure 1 is a partial end elevation showing an impulse coupling together with the restraining means on the end of a magneto.

Figure 2 is a side elevation of Fig. 1.

Figure 3 is a detail elevation of the driven member showing the impulse spring in position together with the buffer and the driving pin of the driving member shown in dotted position.

Figure 4 is a partial section on the line 4/4 of Fig. 3.

Figure 5 is a partial section on the line 5/5 of Fig. 1.

Referring now to the details wherein like numbers refer to corresponding parts in the various views, 1 illustrates the end plate of a magneto to which is fastened a plate 2 carrying a restraining device in the shape of a pawl 3, the nose of which is adapted to engage notches 4 in the driven member 5. Notches 4 are preferably arranged 180 degrees apart so that two impulses per revolution can be obtained. The driven member 5 has a groove 6 within which the impulse spring 7 is normally positioned, one end of which rests against a pin 8 which passes through the rim of the member 5 into the hub 9 transversely across the groove as is indicated in Fig. 3. This gives an abutment for the spring 7, which has a support at either end and which I have found to be preferable over the ordinary abutment consisting of merely a stud fastened to the bottom of the grooved portion of member 5 as indicated in the said Hermann patent. The other end of the spring 7 engages a pin 10 carried by the driving member 11, the pin 10 being indicated in dotted position in Fig. 3, and when in normal operating position rests against a bumper or buffer 23, which may be a spring or some other resilient material. As shown particularly in Fig. 2, the pin 10 is fastened to the outer flange of the driving member 11 and projects through the inner flange of the driving member into the groove 6, terminating in a head 24 therein. The driven member 5 is held to the shaft of the magneto by a nut 12 and washer 13, the washer 13 fitting within the counterbore 14 in the driving member and indicated by dotted line 14 in Fig. 2. The nut and washer, therefore, beside holding the driven member 5 on the magneto shaft, serve also to hold the driving member 11 in operative position with respect to the driven member.

The impulse coupling functions in the well known manner, by actuating the lever 15 to throw the pawl 3 into position to engage the notches 4, whereupon the driving member 11, which is turned by the flanges 16 engaging an engine operated member, continues to rotate until the cams 17 throw the pawl 3 out of engagement with the notches 4 and the driven member 5 is thrown rapidly forward by the spring 7 to produce an impulse of the magneto rotating member in order to insure a good spark at low speeds.

In order to prevent any lag between the driving and driven members I provide in one of the members, preferably the driven member 5, a plurality of counterbored holes; that is to say two holes, one of larger diameter than the other. Positioned in the hole of smaller diameter is a plunger, preferably in the shape of a pawl 18 that is pressed outward by spring 19 so as to project beyond the face 20 of the driven member, it being understood that the face 20 is the face of the member 5 that is presented toward the driving member 11. The tension on the spring 19 may be set to any predetermined amount by means of a screw 21, after which which the metal of member 5 near the head of the screw may be stacked over to prevent the screw from backing out. Cooperating with the plungers 18 are recesses 22 in the driving member 11. These are preferably placed diametrically opposite each other on the back surface of the cam members 17. These depressions 22 are clearly indicated in Fig. 5 and shown in dotted position in Fig. 1. The relation between the plungers 18 and depressions 22 is such that the drag or torque of the magneto rotating member, will not displace the driving and driven members or force the plungers 18 out of the depressions 22, it being understood that the member 11 cannot move endwise on account of the nut 12 and washer 13. However, when the restraining device 3 is operated then the turning effort of the driving member 11 causes the plunger to be pushed back into the counterbored hole against the tension of the spring 19 and allows the coupling members to function to give an impulse. I prefer to make the tension of springs 19 sufficient to give a factor of safety so that even with the strongest magnetic attraction between the rotating member and its cooperating pole pieces there will be no lagging of the driven member behind the driving member.

It will be seen that I have provided a very simple and relatively inexpensive means for locking the driving and driven members together, but I do not wish to be limited to the exact construction, except as limited by the scope of the appended claims.

Having thus described my invention, what I claim is:

1. In an ignition attachment of the class described, a driven member having a hub for attachment purposes to a driven shaft, and an annular groove between the hub and rim, a pin passing through the rim and into the hub portion and intersecting the groove, a driving member held in operative position on the driven member by means on the driven shaft, and having an operating stud, means for restraining the driven member through a predetermined angle of rotation of the driving member and then releasing it, a spring within said groove having one end abutting against said pin and the other against said stud, said spring acting to cause the driven member to rapidly overtake the driving member after its release as and for the purpose described.

2. In an ignition attachment of the class described, a driven member having a hub for attachment purposes to a driven shaft and an annular groove between the hub and rim, a pin passing through the rim and into the hub portion and intersecting the groove, a driving member held in operative position on the driven shaft, and having an operating stud, means for restraining the driven member through a predetermined angle of rotation of the driving member and then releasing it, a spring within said groove having one end abutting against said pin and the other against said stud, said spring acting to cause the driven member to rapidly overtake the driving member after its release, and means for preventing an angular displacement between the coupling members during operation, said means, consisting of; a pair of spring actuated plungers arranged substantially diametrically opposite in one coupling member and projecting into recesses in the other member.

In testimony whereof, I affix my signature.

EDWARD B. NOWOSIELSKI.